US012698867B2

(12) United States Patent
Toureille et al.

(10) Patent No.: US 12,698,867 B2
(45) Date of Patent: Aug. 4, 2026

(54) TANK COMPRISING INNER AND OUTER ENCLOSURES AND AT LEAST ONE TUBULAR INTERFACE IN TWO PARTS PASSING THROUGH THE INNER AND OUTER ENCLOSURES

(71) Applicants: Airbus Operations SAS, Toulouse (FR); CETIM (Centre Technique des Industries Mécaniques), Senlis (FR)

(72) Inventors: Nicolas Toureille, Toulouse (FR); Chloé Mesic, Toulouse (FR); Laure Moretti, Toulouse (FR); Denis Espinassou, Bouguenais (FR)

(73) Assignees: Airbus Operations SAS, Toulouse (FR); CETIM (Centre Technique des Industries Mécaniques), Senlis (FR)

( * ) Notice: Subject to any disclaimer, the term of this patent is extended or adjusted under 35 U.S.C. 154(b) by 57 days.

(21) Appl. No.: 18/647,945

(22) Filed: Apr. 26, 2024

(65) Prior Publication Data

US 2024/0360960 A1 Oct. 31, 2024

(30) Foreign Application Priority Data

Apr. 28, 2023 (FR) ....................................... 2304306

(51) Int. Cl.
*F17C 13/04* (2006.01)

(52) U.S. Cl.
CPC ...... *F17C 13/04* (2013.01); *F17C 2201/0109* (2013.01); *F17C 2203/0629* (2013.01); *F17C 2209/228* (2013.01); *F17C 2221/012* (2013.01)

(58) Field of Classification Search
CPC .............. F17C 13/04; F17C 2201/0109; F17C 2203/0629; F17C 2209/228;
(Continued)

(56) References Cited

U.S. PATENT DOCUMENTS 7,344,045 B2 3/2008 Harper et al.
2013/0299501 A1* 11/2013 Lee ......................... F17C 1/005 220/560.04

(Continued)

FOREIGN PATENT DOCUMENTS

CN 114857487 A * 8/2022 ................ F17C 3/04
DE 202005006034 U1 7/2005

(Continued)

OTHER PUBLICATIONS

English Machine Translation of CN-114857487-A (Year: 2022).*
French Search Report for corresponding French Patent Application No. 2304306 dated Oct. 29, 2023.

*Primary Examiner* — Laura E. Parker
(74) *Attorney, Agent, or Firm* — Greer, Burns & Crain, Ltd.

(57) ABSTRACT

A tank comprising an outer enclosure, an inner enclosure positioned in the outer enclosure and at least one tubular interface passing through the outer and inner enclosures and linked to the outer enclosure by a first link and to the inner enclosure by a second link, the tubular interface comprising at least two sections placed end-to-end and at least one joining system linking the sections pairwise, a first section being linked to the outer enclosure by the first link, a second section being linked to the inner enclosure by the second link.

8 Claims, 3 Drawing Sheets

(58) Field of Classification Search
CPC .......... F17C 2221/012; F17C 2201/056; F17C 2203/012; F17C 2209/234; F17C 13/06; F17C 2201/054; F17C 2203/018; F17C 2203/03; F17C 2223/0161; F17C 2223/033; F17C 2260/011; F17C 2260/036; F17C 2270/0189; F17C 2203/014
USPC ............ 220/581, 560.1, 560.04, 560.11, 901
See application file for complete search history.

(56) References Cited

U.S. PATENT DOCUMENTS

| | | | | |
|---|---|---|---|---|
| 2014/0166662 | A1 | 6/2014 | Snyder et al. | |
| 2014/0263358 | A1 | 9/2014 | Espinosa-Ioza et al. | |
| 2017/0130900 | A1* | 5/2017 | Strange | F17C 3/08 |
| 2022/0042651 | A1 | 2/2022 | Fournel | |
| 2023/0159165 | A1* | 5/2023 | Vercamer | B64D 1/00<br>220/560.1 |

FOREIGN PATENT DOCUMENTS

| | | | | |
|---|---|---|---|---|
| DE | 112005000873 | T5 | 3/2007 | |
| DE | 102014206370 | A1 | 10/2015 | |
| GB | 2398115 | A * | 8/2004 | G01F 23/26 |
| NL | 8801044 | A | 11/1989 | |
| SU | 1502897 | A1 | 8/1989 | |

* cited by examiner

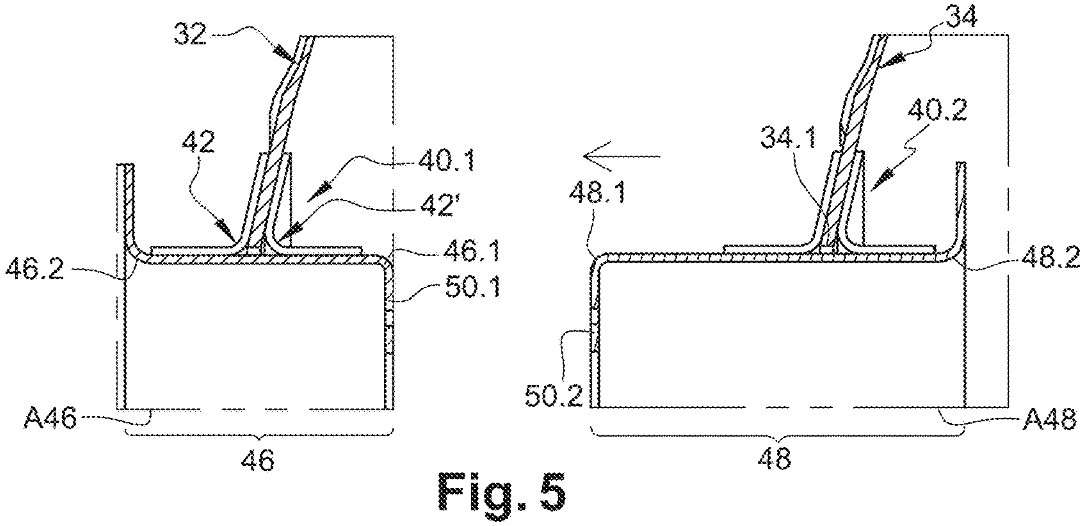
Fig. 5
Fig. 6
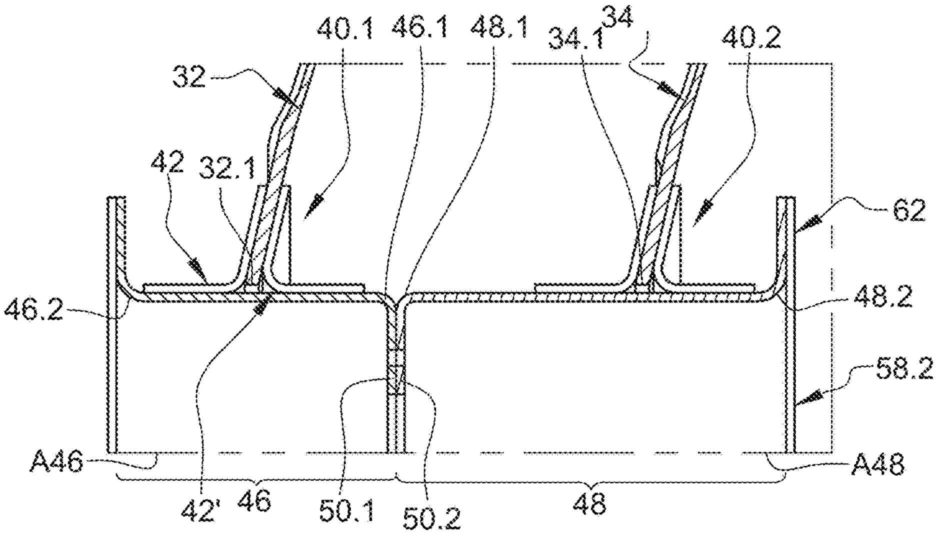
Fig. 7
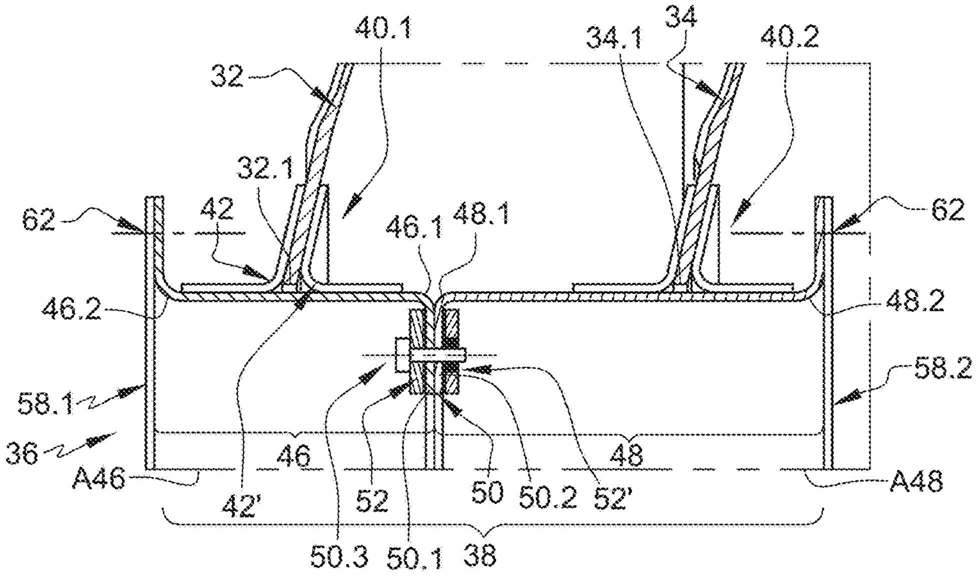

TANK COMPRISING INNER AND OUTER ENCLOSURES AND AT LEAST ONE TUBULAR INTERFACE IN TWO PARTS PASSING THROUGH THE INNER AND OUTER ENCLOSURES

CROSS-REFERENCES TO RELATED APPLICATIONS

This application claims the benefit of French Patent Application Number 2304306 filed on Apr. 28, 2023, the entire disclosure of which is incorporated herein by way of reference.

FIELD OF THE INVENTION

The present application relates to a dual-enclosure tank suitable for storing a fluid in the cryogenic state.

BACKGROUND OF THE INVENTION

According to an embodiment that can be seen in FIG. 1, a hydrogen tank 10 comprises an outer enclosure 12, an inner enclosure 14 positioned in the outer enclosure 12, a thermal insulation between the outer and inner enclosures 12, 14 and two diametrically opposite link systems 16, 16' linking the outer and inner enclosures 12, 14. In operation, because of the temperature and the storage pressure of the hydrogen in the cryogenic state, the inner enclosure 14 can, depending on the situations, contract or expand more than the outer enclosure 12. Consequently, at least one of the two link systems 16' is configured to allow a displacement of the inner enclosure 14 with respect to the outer enclosure 12 in a direction of displacement. According to one arrangement, the first link system 16 (that on the left in FIG. 1) is substantially rigid while the second link system 16' (that on the right in FIG. 1) allows a relative movement between the outer and inner enclosures 12, 14.

The first link system 16 comprises a tubular interface 18 passing through the outer and inner enclosures 12, 14 and having a first end 18.1 emerging outside of the outer tank 12 and a second end 18.2 emerging inside the inner tank 14. In addition, the first link system 16 comprises a first closure plate 20.1 shutting the first end 18.1 of the tubular interface 18 and a second closure plate 20.2 shutting the second end 18.2 of the tubular interface 18.

Each of the outer and inner enclosures 12, 14 comprises a through-hole to allow the tubular interface 18 to pass through it. In addition, the tank comprises a first link 22.1 linking the tubular interface 18 and the outer enclosure 12 and a second link 22.2 linking the tubular interface 18 and the inner enclosure 14.

The hydrogen tank 10 comprises several ducts 24, 24' which pass through the first and second closure plates 20.1, 20.2 and each comprise an end emerging in the inner enclosure 14. All these ducts 24, 24' are rectilinear between the first and second closure plates 20.1, 20.2.

In one embodiment, the materials of the different elements (enclosures, ducts, closure plates, link systems) can be different: for example metal/composite.

According to one embodiment, each of the outer and inner enclosures 12, 14 is produced from at least two separate parts which are assembled together.

According to one method of assembly, the tubular interface 18 is linked to the inner enclosure 14 by virtue of the second link 22.2 then the two parts of the inner enclosure 14 are assembled together. The inner enclosure 14 is introduced into a part of the outer enclosure 12 then the tubular interface 18 is linked to the outer enclosure 12 by virtue of the first link 22.1. Finally, the two parts of the outer enclosure 12 are assembled together.

Inasmuch as the inner enclosure 14 is not yet positioned in the outer enclosure 12 and the two parts of the inner enclosure 14 are not yet assembled together, the two faces of the inner enclosure 14 are accessible during the assembly of the tubular interface 18 and of the inner enclosure 14. Consequently, the second link 22.2 comprises two L-shaped flanges 26, 26' on either side of the inner enclosure 14, each flange 26, 26' comprising a first wing 26.1, 26.1' pressed against the inner enclosure 14 and linked thereto and a second wing 26.2, 26.2' pressed against the tubular interface 18 and linked thereto.

According to an embodiment that can be seen in FIG. 2, the first link 22.1 comprises a single L-shaped flange 28 situated outside of the outer enclosure 12 inasmuch as, for reasons of accessibility, it is not possible to install a second L-shaped flange which would be situated inside the outer enclosure. This single flange 28 comprises a first wing 28.1 pressed against the outer enclosure 12 and linked thereto and a second wing 28.2 pressed against the tubular interface 18 and linked thereto. However, given that the first link 22.1 comprises only this single L-shaped flange 28, this solution is not fully satisfactory in terms of mechanical strength and seal-tightness.

SUMMARY OF THE INVENTION

The present invention aims to remedy all or part of the abovementioned drawbacks.

To this end, the subject of the invention is a tank comprising an outer enclosure separating an outside zone and an intermediate zone, an inner enclosure positioned in the outer enclosure and separating an inside zone and the intermediate zone and at least one link system linking the outer and inner enclosures and comprising a tubular interface passing through the outer and inner enclosures; the tubular interface having a first end emerging in the zone outside the outer tank and a second end emerging in the zone inside the inner tank, the tank comprising a first link linking the tubular interface and the outer enclosure and a second link linking the tubular interface and the inner enclosure.

According to the invention, the tubular interface comprises at least two sections placed end-to-end and at least one joining system linking the sections pairwise, a first section being linked to the outer enclosure by the first link, a second section being linked to the inner enclosure by the second link.

Inasmuch as the tubular interface comprises two sections, the latter can be linked respectively to the outer and inner enclosures when the latter are separated and not positioned one inside the other, both of their faces being accessible. Consequently, each of the first and second links can comprise elements positioned on either side of the outer or inner enclosure in order to optimize their mechanical strength.

According to another feature, the first section comprises the first end of the tubular interface and/or the second section comprises the second end of the tubular interface.

According to another feature, the joining system comprises a first flange ring secured to the first section, a second flange ring secured to the second section and at least one link element keeping the first and second flange rings pressed against one another.

According to one configuration, the tubular interface has an axis of revolution. In addition, the first and second flange rings are oriented toward the axis of revolution of the tubular interface.

According to another feature, the first section and the first flange ring are produced in a single piece and/or the second section and the second flange ring are produced in a single piece.

According to another feature, the joining system comprises at least one crown ring pressed against at least one of the first and second flange rings.

According to another feature, the joining system comprises first and second crown rings between which the first and second flange rings are positioned.

According to another feature, the joining system comprises several link elements passing through at least the first and second flange rings, the link elements being of blind type to allow them to be put in place from a single end of the tubular interface.

According to one configuration, the first crown ring is the closest to the first end of the tubular interface. In addition, for each link element, each of the first and second crown rings comprises a through-hole, this through-hole being smooth for the first crown ring and fitted with a tapped insert for the second crown ring, each link element being a screw configured to be screwed into the tapped insert of the second crown ring.

BRIEF DESCRIPTION OF THE DRAWINGS

Other features and advantages will emerge from the following description of the invention, a description given purely by way of example, in light of the attached drawings in which:

FIG. 5 is a longitudinal cross-section of a link system in the non-assembled state, the inner and outer enclosures being separated, illustrating an embodiment of the invention, FIG. 6 is a longitudinal cross-section of the link system that can be seen in FIG. 5 in the non-assembled state, the inner and outer enclosures being brought together, FIG. 7 is a longitudinal cross-section of the link system that can be seen in FIG. 5 in the assembled state.

DETAILED DESCRIPTION OF THE PREFERRED EMBODIMENTS

Figure 1:
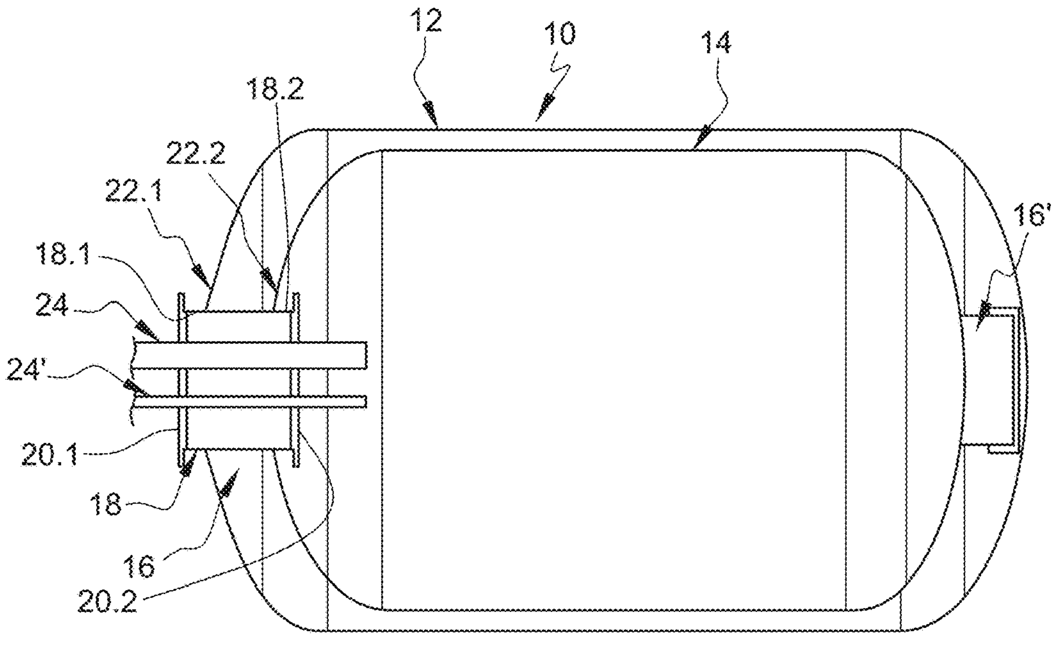
Fig. 1 (prior art)
FIG. 1 is a longitudinal cross-section of a tank illustrating an embodiment of the prior art.
Figure 2:
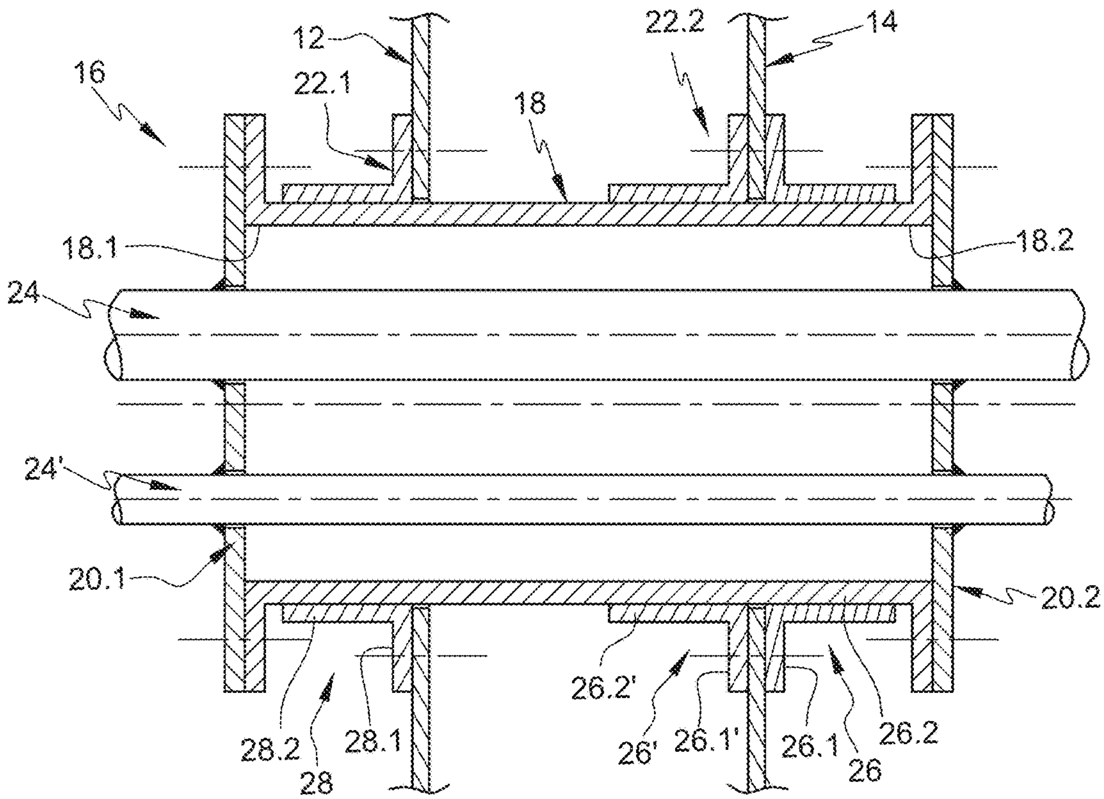
Fig. 2 (prior art)
FIG. 2 is a longitudinal cross-section of a link system, linking outer and inner enclosures of the tank that can be seen in FIG. 1, illustrating an embodiment of the prior art.

According to embodiments that can be seen in FIGS. 3 to 7, a tank 30 comprises an outer enclosure 32 separating an outside zone and an intermediate zone, an inner enclosure 34 positioned in the outer enclosure 32 separating an inside zone and the intermediate zone and two diametrically opposite link systems 36, 36', linking the outer and inner enclosures 32, 34. According to one configuration, the tank 30 can comprise a thermal insulation between the outer and inner enclosures 32, 34.

According to one arrangement, the first link system 36 is substantially rigid while the second link system 36' (not represented in detail) allows a relative movement between the outer and inner enclosures 32, 34. The second link system is configured to allow a relative movement between the outer and inner enclosures 32, 34, oriented in a longitudinal direction.

According to one application, an aircraft comprises at least one tank 30 used to store a fluid in the cryogenic state, such as hydrogen for example. Obviously, the invention is not limited to this application. It is also not limited to two link systems. Whatever the embodiment, the tank 30 comprises at least one link system 36.

Figure 3:
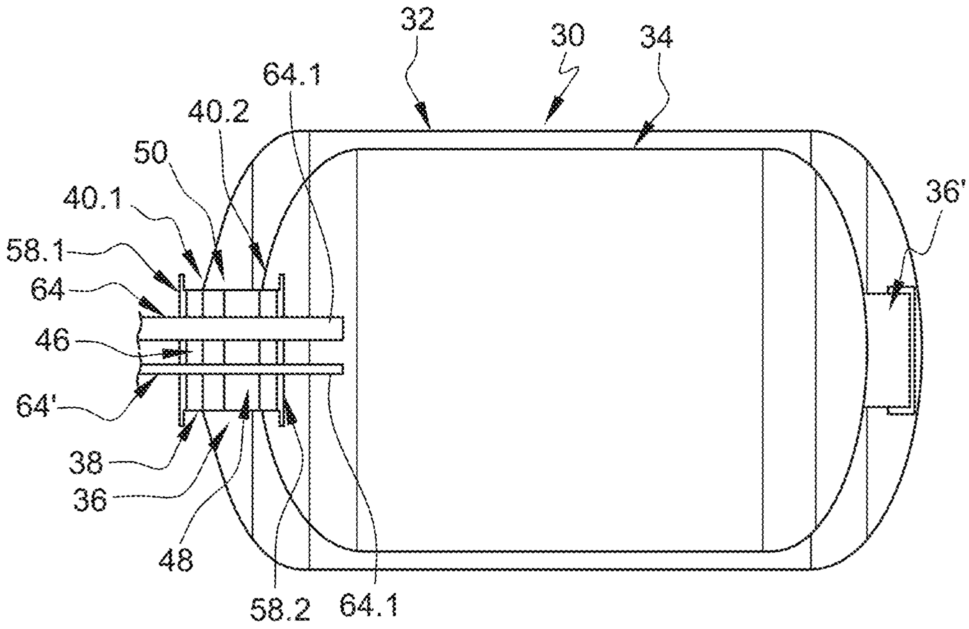
FIG. 3 is a longitudinal cross-section of a tank illustrating an embodiment of the invention.
Figure 4:
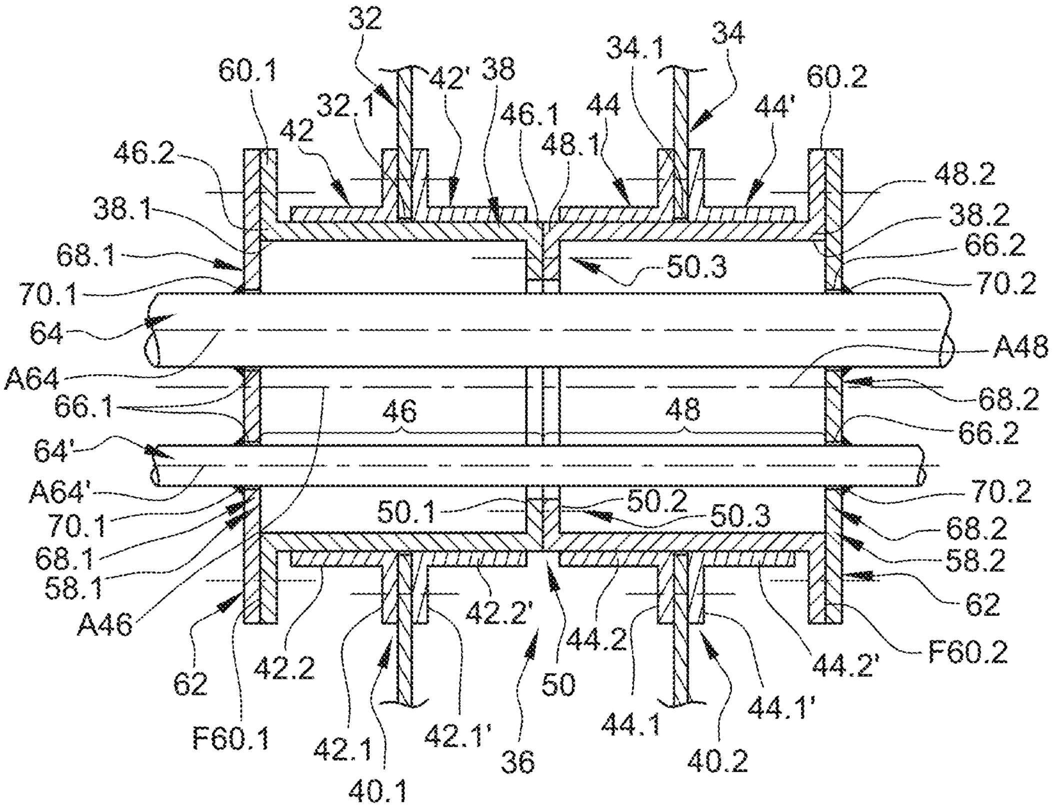
FIG. 4 is a longitudinal cross-section of a link system, linking outer and inner enclosures of the tank that can be seen in FIG. 3, illustrating an embodiment of the invention.

According to an arrangement visible in FIG. 3, each of the outer and inner enclosures 32, 34 comprises a cylindrical central part and two parts in dome form positioned at each of the ends of the cylindrical central part. Obviously, the invention is not limited to these forms for the outer and inner enclosures 32, 34. Moreover, the link system 36, 36' is not necessarily positioned at a part in dome form.

The link system 36 comprises a tubular interface 38 passing through the outer and inner enclosures 32, 34, linked thereto and having a first end 38.1 emerging in the zone outside the outer tank 32 and a second end 38.2 emerging in the zone inside the inner tank 34, each of the outer and inner enclosures 32, 34 comprising a through-hole 32.1, 34.1 to allow the tubular interface 38 to pass through it. The tubular interface 38 is cylindrical and has an axis of revolution parallel to the longitudinal direction.

The tank 30 comprises a first link 40.1 linking the tubular interface 38 and the outer enclosure 32 and a second link 40.2 linking the tubular interface 38 and the inner enclosure 34.

According to one configuration, the first link 40.1 comprises two L-shaped flanges 42, 42' positioned on either side of the outer enclosure 32, each flange 42, 42' comprising a first wing 42.1, 42.1' pressed against the outer enclosure 32 and linked thereto and a second wing 42.2, 42.2' pressed against the tubular interface 38 and linked thereto. The second link 40.2 comprises two L-shaped flanges 44, 44' positioned on either side of the inner enclosure 34, each flange 44, 44' comprising a first wing 44.1, 44.1' pressed against the inner enclosure 34 and linked thereto and a second wing 44.2, 44.2' pressed against the tubular interface 38 and linked thereto.

The presence of two flanges 42, 42', 44, 44' for each of the first and second links 40.1, 40.2, positioned on either side of the outer or inner enclosure 32, 34, makes it possible to obtain first and second links that are optimal in terms of mechanical strength.

Obviously, the invention is not limited to this configuration for the first and second links 32, 34.

According to a feature of the invention, the tubular interface 38 comprises at least two sections 46, 48 placed end-to-end and at least one joining system 50 linking the sections pairwise, a first section 46 being linked to the outer enclosure 32 by the first link 40.1, a second section 48 being linked to the inner enclosure 34 by the second link 40.2. According to one configuration, the first section 46 comprises the first end 38.1 of the tubular interface 38 and/or the second section 48 comprises the second end 38.2 of the tubular interface 38.

According to one arrangement, the first and second sections 46, 48 are linked by the joining system 50, no section being inserted between them.

According to one embodiment, the first section 46 is cylindrical and has an axis of revolution A46. It extends between a first end 46.1 linked to the second section 48 and a second end 46.2 which corresponds to the first end 38.1 of the tubular interface 38. The second section 48 is cylindrical and has an axis of revolution A48. It extends between a first end 48.1 linked to the first section 46 and a second end 48.2 which corresponds to the second end 38.2 of the tubular interface 38.

According to one embodiment, the joining system 50 comprises a first flange ring 50.1 secured to the first section 46, a second flange ring 50.2 secured to the second section 48 and at least one link element 50.3 keeping the first and second flange rings 50.1, 50.2 pressed against one another. According to one configuration, the first and second flange rings 50.1, 50.2 are oriented toward the axis of revolution of the tubular interface 38.

According to one embodiment, the first section 46 and the first flange ring 50.1 are produced in a single piece and/or the second section 48 and the second flange ring 50.2 are produced in a single piece.

According to a configuration that can be seen in FIG. 7, the joining system 50 comprises at least one crown ring 52 pressed against at least one of the first and second flange rings 50.1, 50.2. According to one arrangement, the joining system 50 comprises two crown rings 52, 52' between which the first and second flange rings 50.1, 50.2 are positioned. When the first or second section 46, 48 and the first or second flange ring 50.1, 50.2 are produced in a single piece, the presence of at least one crown ring 52, 52' limits the risks of unfolding of the first or second flange ring 50.1, 50.2.

According to one embodiment, the joining system comprises several link elements 50.3 distributed around the tubular interface 38 and passing through at least the first and second flange rings 50.1, 50.2. The link elements 50.3 are link elements of blind type allowing them to be put in place from a single end of the tubular interface 38, notably from the first end 38.1 that is accessible from the zone outside the tank 30. According to one configuration, the joining system 50 comprises first and second crown rings 52, 52', the first crown ring 52 being closest to the first end 38.1 of the tubular interface 38. For each link element 50.3, each of the first and second crown rings 52, 52' comprises a through-hole, this through-hole being smooth for the first crown ring 52 and fitted with a tapped insert for the second crown ring 52'. In addition, each link element 50.3 is a screw configured to be screwed into the tapped insert of the second crown ring 52'. Obviously, the invention is not limited to this configuration to obtain link elements 50.3 of blind type. Similarly, the joining system 50 is not limited to an assembly obtained from bolts, screws or rivets. Thus, the joining system 50 could be obtained by gluing, welding or any other assembly technique.

According to one procedure, the first and second sections 46, 48 are linked respectively to the outer and inner enclosures 32, 34 when the two outer and inner enclosures 32, 34 are separated and not positioned one inside the other, as illustrated in FIG. 5. For each of the outer and inner enclosures 32, 34, their two faces are accessible so that each of the first and second links 40.1, 40.2 can comprise elements positioned on either side of the outer or inner enclosure 32, 34. Thus, the first and second links 40.1, 40.2 are optimal with respect to the mechanical strength.

Next, the inner enclosure 34 is positioned in a part of the outer enclosure 32 until the first and second sections 46, 48 are abutted end-to-end, as illustrated in FIG. 6. Next, the first and second sections 46, 48 are assembled together by virtue of the joining system 50, as illustrated in FIG. 7.

The link system 36 comprises a first closure plate 58.1 closing the first end 38.1 of the tubular interface 38 and a second closure plate 58.2 closing the second end 38.2 of the tubular interface 38. According to one configuration, the tubular interface 38 comprises a first flange ring 60.1 at its first end 38.1 and a second flange ring 60.2 at its second end 38.2, each of the first and second flange rings 60.1, 60.2 having a contact face F60.1, F60.2, positioned in a transverse plane at right angles to the axis of revolution of the tubular interface 38, against which the corresponding closure plate 58.1, 58.2 is pressed.

Each of the first and second closure plates 58.1, 58.2 takes the form of a disc and comprises at least one coupling zone 62 linked, directly or indirectly, to the outer or inner enclosure 32, 34. At the coupling zones 62, each closure plate 58.1, 58.2 is pressed against the contact face F60.1, F60.2 of the corresponding first or second flange ring 60.1, 60.2 and linked thereto by link elements. The coupling zones 62 of the first and second closure plates 58.1, 58.2 are rigid. According to one configuration, each coupling zone 62 takes the form of a crown ring.

When they are fixed to the tubular interface 38, the first and second closure plates 58.1, 58.2 are substantially parallel to one another and at right angles to the longitudinal direction.

The tank 30 comprises at least one duct 64 which passes through the first and second closure plates 58.1, 58.2 and comprises a first end 64.1 emerging in the inner enclosure 34 and a second end emerging in the zone outside the outer enclosure 32.

For each duct 64, the first closure plate 58.1 comprises a first orifice 66.1 to allow the duct 64 to pass through said first closure plate 58.1 and a first link zone 68.1 which surrounds the first orifice 66.1 and comprises a first link 70.1 linking the duct 64 and the first closure plate 58.1. At the first orifice 66.1, each duct 64 has an axis of revolution A64 parallel to the longitudinal direction. For each duct 64, the second closure plate 58.2 comprises a second orifice 66.2 to allow the duct 64 to pass through said second closure plate 58.2 and a second link zone 68.2 which surrounds the second orifice 66.2 and comprises a second link 70.2 linking the duct 64 and the second closure plate 58.2. At the second orifice 66.2, each duct 64 has an axis of revolution A64 parallel to the longitudinal direction.

The first and second links 70.1, 70.2 are rigid links. Consequently, the first and second link zones 68.1, 68.2 are substantially rigid. Each of the first and second links 70.1, 70.2 is a tight link ensuring a fluid-tightness between the duct 64 and the first or second closure plate 58.1, 58.2. As an example, each of the first and second links 70.1, 70.2 comprises at least one weld bead around the duct 64 and ensuring a tight link between the latter and the closure plate 58.1, 58.2. Obviously, the invention is not limited to this embodiment for the first and second rigid links 70.1, 70.2. As an example, the first or second link 70.1, 70.2 could take the form of a flange.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tank comprising:

an outer enclosure separating an outside zone and an intermediate zone, an inner enclosure positioned in the outer enclosure and separating an inside zone and the intermediate zone, at least one link system linking the outer and inner enclosures, the at least one link system comprising a tubular interface passing through the outer and inner enclosures, the tubular interface having a first end emerging in the outside zone and a second end emerging in the inside zone, a first link linking the tubular interface and the outer enclosure, a second link linking the tubular interface and the inner enclosure, wherein the tubular interface comprises at least two sections including a first section and a second section placed end-to-end and at least one joining system linking the at least two sections pairwise, the first section being linked to the outer enclosure by the first link and the second section being linked to the inner enclosure by the second link, wherein the at least one joining system comprises a first flange ring secured to the first section, a second flange ring secured to the second section and at least one link element keeping the first and second flange rings pressed against one another, wherein the tubular interface has an axis of revolution and wherein the first and second flange rings are oriented toward the axis of revolution of the tubular interface, and wherein the at least one joining system comprises a plurality of link elements passing through at least the first and second flange rings.

2. The tank as claimed in claim 1, wherein the first section comprises the first end of the tubular interface, and/or the second section comprises the second end of the tubular interface.

3. The tank as claimed in claim 1, wherein the first section and the first flange ring are produced in a single piece, and/or the second section and the second flange ring are produced in a single piece.

4. The tank as claimed in claim 3, wherein the at least one joining system comprises at least one crown ring pressed against at least one of the first and second flange rings.

5. The tank as claimed in claim 4, wherein the at least one joining system comprises first and second crown rings between which the first and second flange rings are positioned.

6. The tank as claimed in claim 1, the link elements configured to be installed from a single end of the tubular interface.

7. The tank as claimed in claim 6, wherein the at least one joining system comprises first and second crown rings between which the first and second flange rings are positioned, wherein the first crown ring is closest to the first end of the tubular interface, wherein, for each link element, each of the first and second crown rings comprises a through-hole, each through-hole being smooth for the first crown ring and fitted with a tapped insert for the second crown ring, and wherein each link element is a screw configured to be screwed into the tapped insert of the second crown ring.

8. The tank as claimed in claim 1, wherein the first link comprises two L-shaped flanges positioned on either side of the outer enclosure, each flange including a first wing pressed against the outer enclosure and linked thereto and a second wing pressed against the tubular interface and linked thereto, such that the flanges of the first link are accessible from the outside zone, and wherein the second link comprises two L-shaped flanges positioned on either side of the inner enclosure, each flange including a first wing pressed against the inner enclosure and linked thereto and a second wing pressed against the tubular interface and linked thereto.

* * * * *